United States Patent
Drocco et al.

(10) Patent No.: US 8,646,496 B2
(45) Date of Patent: Feb. 11, 2014

(54) SYSTEM FOR RELEASE OR MOVEMENT OF A FLUID-DISPENSING HEAD

(76) Inventors: Mario Drocco, Alba (IT); Luca Drocco, Alba (IT)

( * ) Notice: Subject to any disclaimer, the term of this patent is extended or adjusted under 35 U.S.C. 154(b) by 572 days.

(21) Appl. No.: 12/874,877

(22) Filed: Sep. 2, 2010

(65) Prior Publication Data

US 2011/0056586 A1   Mar. 10, 2011

(30) Foreign Application Priority Data

Sep. 4, 2009 (IT) .............................. TO20090124 U

(51) Int. Cl.
*B65B 1/04* (2006.01)
*B60K 15/04* (2006.01)

(52) U.S. Cl.
CPC ...................................... *B60K 15/04* (2013.01)
USPC ........... 141/304; 141/387; 141/392; 222/148; 239/115

(58) Field of Classification Search
USPC .................... 141/57, 304, 387, 392; 222/148; 239/115
See application file for complete search history.

(56) References Cited

U.S. PATENT DOCUMENTS

| 2,835,410 | A |   | 5/1958 | Arnett et al. |
|-----------|---|---|--------|---------------|
| 3,176,731 | A | * | 4/1965 | Minard ......................... 141/295 |
| 3,289,712 | A | * | 12/1966 | Smith ........................... 141/295 |
| 4,613,078 | A | * | 9/1986 | Marshall ...................... 239/390 |
| 4,893,733 | A | * | 1/1990 | Thomsen ...................... 222/559 |
| 5,690,252 | A |   | 11/1997 | Oleksiewicz et al. |
| 5,740,844 | A | * | 4/1998 | Miller ............................ 141/90 |
| 5,782,274 | A | * | 7/1998 | Kaneko et al. .................. 141/90 |
| 6,253,811 | B1 | * | 7/2001 | Slagh ............................ 141/383 |
| 6,585,012 | B1 | * | 7/2003 | Iovino ........................... 141/104 |
| 7,523,771 | B2 | * | 4/2009 | Stavrakis et al. ............. 141/367 |
| 7,562,680 | B2 | * | 7/2009 | Khoo et al. .................... 141/86 |
| 7,581,571 | B2 | * | 9/2009 | Hsing et al. .................... 141/87 |
| 8,047,402 | B2 | * | 11/2011 | Ziesel ........................ 222/145.5 |
| 8,091,737 | B2 | * | 1/2012 | Smeller et al. ............. 222/145.5 |
| 2009/0120958 | A1 | * | 5/2009 | Landers et al. ............ 222/129.1 |

* cited by examiner

*Primary Examiner* — Timothy L Maust
(74) *Attorney, Agent, or Firm* — Merchant & Gould P.C.

(57) ABSTRACT

A system (1) is for release or movement of a fluid-dispensing head (2) positioned within a dispenser (6) of fluids. The system (1) houses the fluid-dispensing head (2), which has nozzles (3) for the supply of fluids. The system (1) includes a release (7, 10, 20) for release and movement of the fluid-dispensing head (2) configured for enabling movement of the delivery head (2) between a first position of use, in which the nozzles (3) deliver fluids into a container (4), and a cleaning position or second position of use (set facing the operator) or third position of use (facing upwards), distinct from the first position of use, in which they are accessible for being cleaned.

4 Claims, 4 Drawing Sheets

SYSTEM FOR RELEASE OR MOVEMENT OF A FLUID-DISPENSING HEAD

This application claims benefit of Serial No. TO2009U000124, filed 4 Sep. 2009 in Italy and which application is incorporated herein by reference. To the extent appropriate, a claim of priority is made to the above disclosed application.

BACKGROUND

The present invention relates to the field of devices for dispensing fluids and in particular regards a system for release or movement of a fluid-dispensing head.

It is known that fluid-dispensing heads are typically mounted within a closed fluid-supply device. With said dispensing heads there is hence a simultaneous or sequential introduction or supply of a given amount of one or more fluids in a container set underneath them, possibly on a resting surface.

The fluid-dispensing head typically comprises a plurality of supply terminals (or nozzles) distinct from one another, each of which supplies a given fluid, which could, for example, be a colouring agent, a paint, a solvent, an additive, an essence or an aroma.

At the end of the supply cycle, in the case where the supply device is to be left inactive for a given period of time, it is expedient for the fluid-dispensing head to be cleaned from fluid residue, which, by hardening in contact with the external environment over time, may cause clogging of the outlet holes of the nozzles.

Normally, the fluid-dispensing head is fixed, and the fluid-outlet holes are set facing downwards.

The cleaning operation is commonly performed manually by an operator, who is forced to bend down or crouch to bring a special cleaning tool up to the nozzles.

Consequently, the action of cleaning requires a plurality of movements by the user, who must clean the fluid-dispensing head working from beneath upwards. The inconvenience of the operation of cleaning of a fluid-dispensing head is encountered in any case even in supply devices of an open type, in which the structure is not completely enclosed in a casing.

SUMMARY

The purpose of the present invention is to provide a system for release or movement of a fluid-dispensing head that will be free from the drawbacks described above.

According to the present invention, a system for release or movement of a fluid-dispensing head is provided.

BRIEF DESCRIPTION OF THE DRAWINGS

The invention will now be described with reference to the annexed drawings, which illustrate a non-limiting example of embodiment thereof and in which:

With reference to FIG. 1, designated as a whole by 1 is a system for release or movement of a fluid-dispensing head.

DETAILED DESCRIPTION

Figure 1:
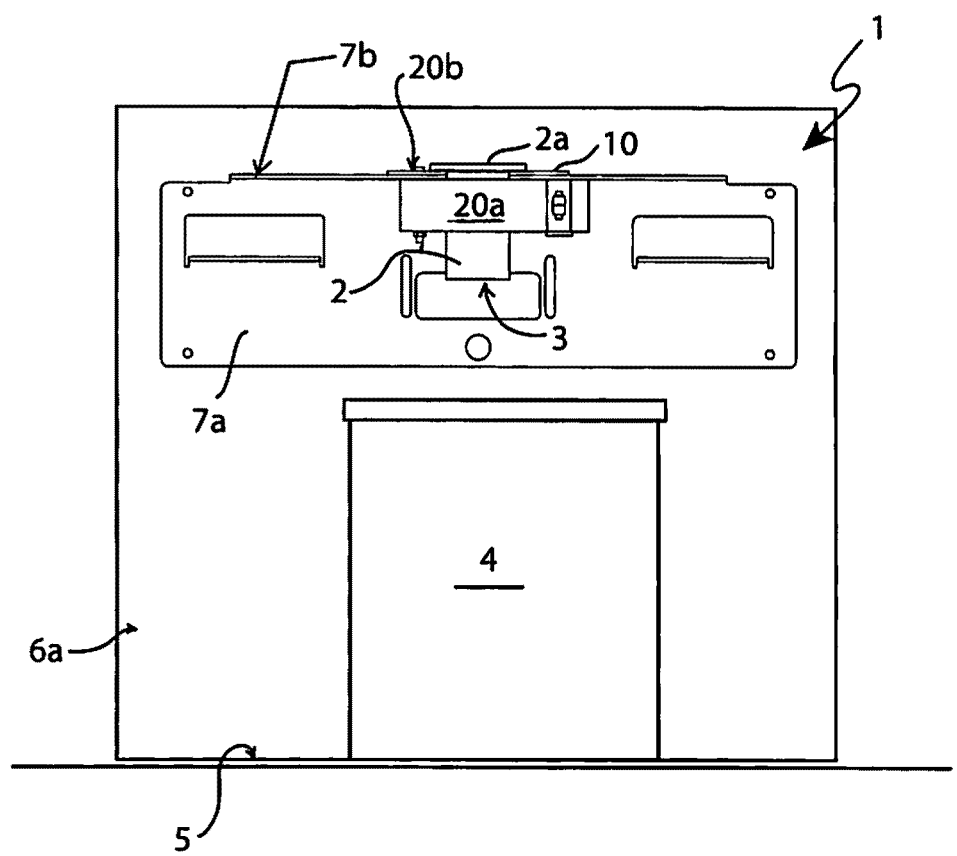
FIG. 1 illustrates a front view of a system for release or movement of a fluid-dispensing head forming the subject of the present invention.
Figure 2:
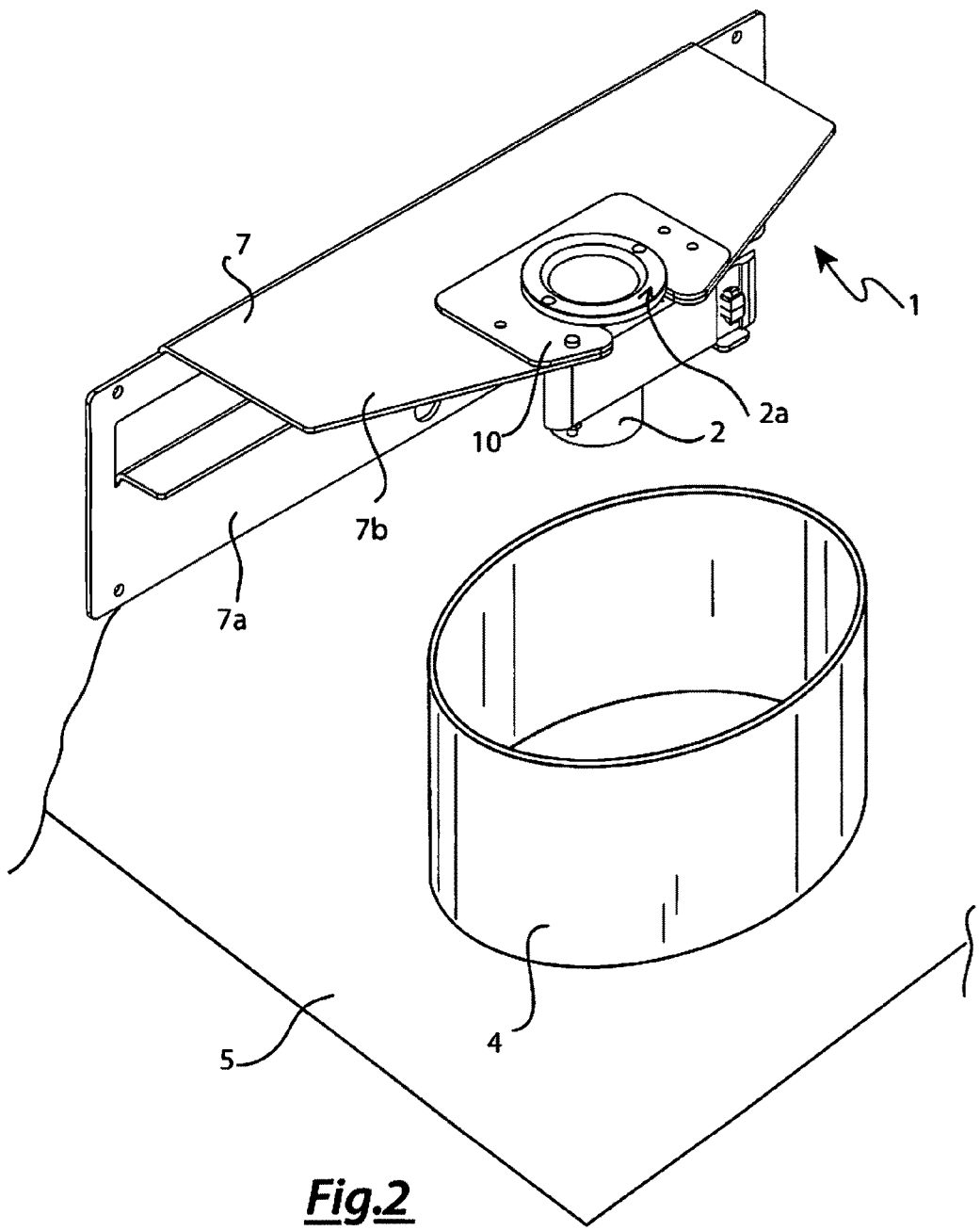
FIG. 2 and FIG. 3 illustrate, respectively, a first perspective view and a second perspective view of the system of FIG. 1.
Figure 3:
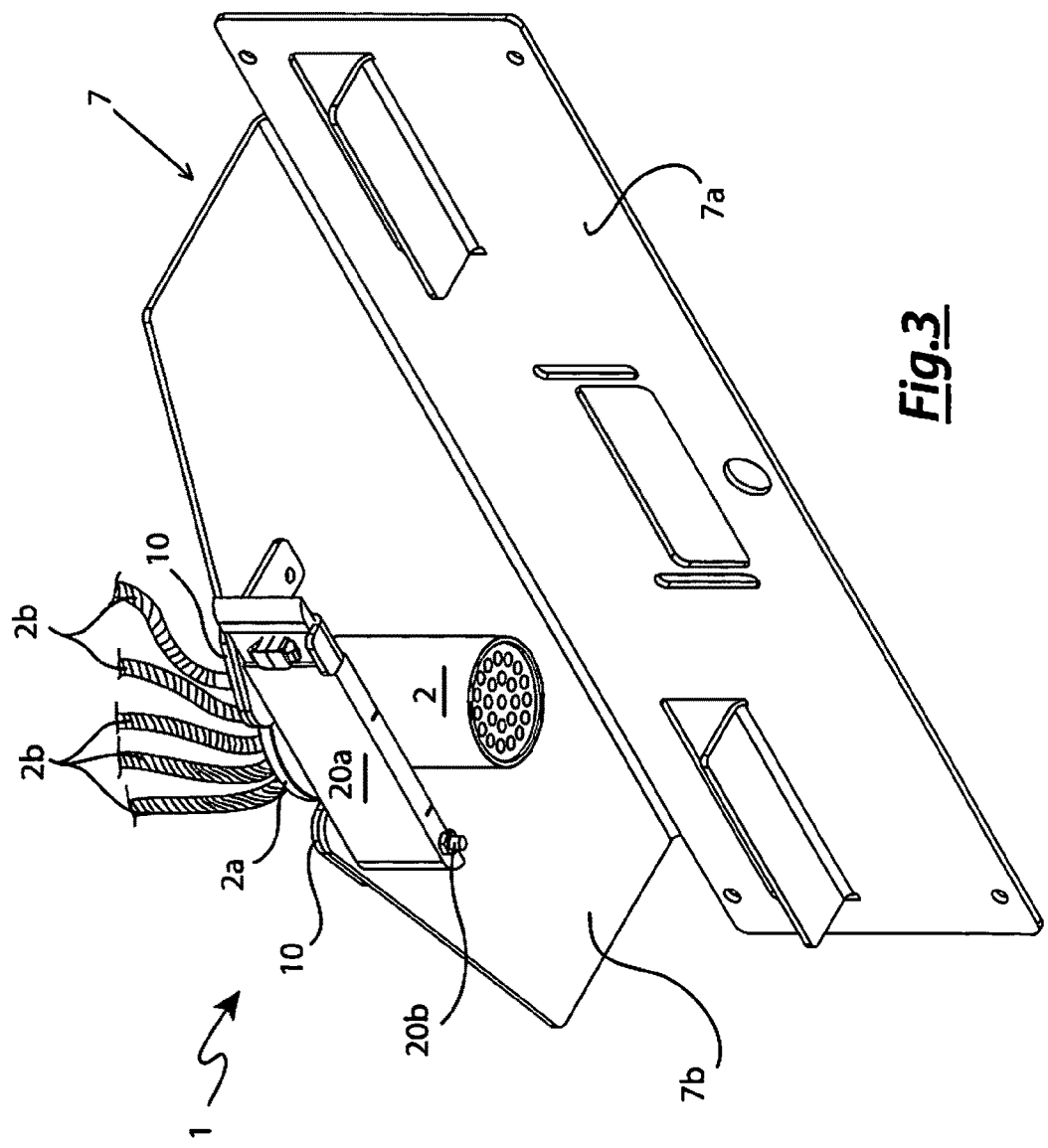
Figure 4:
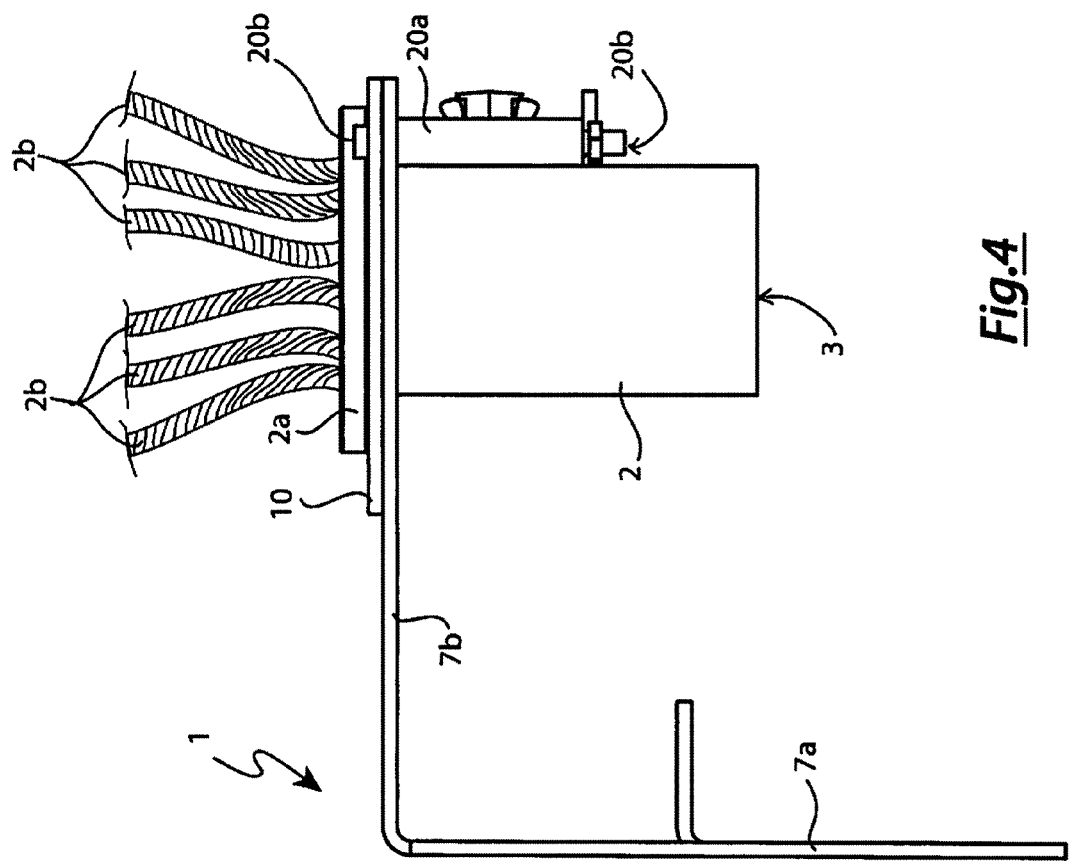
FIG. 4 illustrates a side view of the system of FIG. 1.

System for release or movement of a fluid-dispensing head 1 comprises a fluid-dispensing head 2, which is equipped with a plurality of terminals or nozzles 3 adapted to supply a plurality of fluids of different colours in controlled quantities (in terms, for example, of volume or of delivery time) into a container 4 set underneath said head, on a resting surface of a dispenser 6 of fluids.

Said dispenser 6 typically has a supporting structure 5, on which a user positions the aforesaid container 4.

In detail, nozzles 3 of fluid-dispensing head 2 are arranged on a common surface adjacent to one another and are each connected to a respective duct for supply of the fluid to be dispensed. Substantially, they moreover deliver the respective fluid in a common direction.

Connected to fluid-dispensing head 2 are, on a top part 2a thereof, is a plurality of ducts 2b for introduction of fluids, which are connected to means of their own for supply of the fluids themselves (not illustrated).

Dispenser 6 of fluids is designed in such a way as to get fluid-dispensing head 2 to carry out a pre-determined delivery cycle to obtain a mixture of fluids that, combined together, will enable supply of a final fluid product, the colour of which is the one desired by the customer.

System 1 for movement or release of fluid-dispensing head 2 envisages manual extraction thereof and comprises an L-shaped bracket 7 (head support). In detail, L-shaped bracket 7 is installed within said delivery device 6 in such a way that first surface 7a will be substantially set vertically, whilst, consequently, second surface 7b of L-shaped bracket 7 is set horizontally, parallel to the ground. Fluid-dispensing head 2, which in this case has a cylindrical shape, is mounted in a removable way on second surface 7b of L-shaped bracket 7 through a plate 10 of a slotted type in such a way as to direct the nozzles downwards, i.e., towards the container underlying them.

Plate 10 is open on one side in such a way as to enable extraction of head 2 by a user and, in particular, the opening side of plate 10 is oriented towards the access of delivery device 6 in such a way that a user is able to extract fluid-dispensing head 2 easily for carrying out a cleaning operation on its nozzles 3 to clear away fluid residue. In detail, the slot of plate 10 has a diameter corresponding to the body of fluid-dispensing head 2; top part 2a of fluid-dispensing head 2, instead, has a substantially larger diameter, hence such as to prevent sliding downwards of the fluid-dispensing head itself. In detail, clamping of fluid-dispensing head 2 on L-shaped bracket 7 can be carried out either through a press-block coupling, i.e., through insertion with contrast into the slot of the plate itself, or with the aid of means 20 for clamping fluid-dispensing head 2 in the slot of plate 10.

In detail, said clamping means 20 preferably comprise an element 20a for pressing fluid-dispensing head 2 into the slot, and a pin 20b, to which the aforesaid element 20a is pivoted on an end thereof. Pin 20b has an axis parallel to the direction along which fluid-dispensing head 2 develops.

Consequently, system 1 for release or movement of fluid-dispensing head 2 enables the latter to be kept:

in a first position of use, in which it is constrained to aforesaid L-shaped bracket 7 and in which it is configured for delivering fluids into container 4; and a second position of use, in which it can be oriented manually or with some kind of mechanism in the direction of the operator in such a way as to enable him to clean nozzles 3 at the front.

Alternatively, system 1 for release or movement of a fluid-dispensing head further comprises a servo mechanism for rotation of the aforesaid fluid-dispensing head 2 from the first position of use towards a second position of use, in which nozzles 3 of fluid-dispensing head 2 are set facing the operator.

System 1 for release or movement of the fluid-dispensing head, in this case, can moreover be configured in such a way as to enable said fluid-dispensing head 2 to access a third position of use, as an alternative to or in combination with the second position of use, in which nozzles 3—remaining substantially facing opening 6a of delivery device 6—are oriented substantially upwards.

Finally, system 1 for movement or release comprises means for blocking delivery of fluids from fluid-dispensing head 2; said means enable a greater safety during the operations of cleaning of fluid-dispensing head 2, i.e., when it is in the aforesaid second and/or third position of use. More precisely, when fluid-dispensing head 2 is in the second or third position of use, the fluid cannot be supplied by nozzles 3; instead, only upon reaching the first position of use can the nozzles resume supply of the fluid.

The means for blocking supply can be of a mechanical type (for example, valve means, or again means acting on a system for delivery of the fluid to the nozzles) or of an electrical/electronic type (such as switches, position sensors, or equivalent devices, which then act on the data-processing unit of the supply device) and are typically associated to element 20a. Alternatively, there may be other mechanical blocking and safety devices connected to element 20a.

As yet a further alternative, the release means can be of a push-button kind, positioned on the supply device itself. In this case, when the push-button is depressed, the supply of fluids from the fluid-dispensing head is blocked, and can be resumed only upon release of the aforesaid push-button.

The advantages of the system for release or movement of a fluid-dispensing head so far described are clear in the light of the foregoing description. In particular, it enables in the first place release or movement of fluid-dispensing head 2 either automatically or manually, providing a user with a greater convenience of the cleaning operation, which no longer requires any contortion on his part in order to get underneath the aforesaid fluid-dispensing head 2.

In the second place, system 1 for release or movement of a fluid-dispensing head moreover prevents, during execution of the cleaning operation, any possible occurrence of movements or supplies of fluid that could be dangerous for the operator himself.

Finally, it is clear that a number of variations, additions, and improvements, which will be obvious to a person skilled in the art, may be made to the device described herein, without thereby departing from the sphere of protection of the annexed claims.

In detail, it will be clear that even in the case where the fluid-supply device is not partially enclosed in a casing the effect of greater convenience of cleaning of fluid-dispensing head 2 is not diminished. In fact, even in the case where all the structure is completely accessible, in order to clean fluid-dispensing head 2 it would be necessary to operate in an uncomfortable position. Consequently, the identification of a fluid-supply device of a closed type is not to be understood as in any way limiting for assessing the convenience of use provided by the system forming the subject of the present invention.

The invention claimed is:

1. System positioned within an opening or access of a paint supply device; said system including a fluid-dispensing head, which has a plurality of nozzles for the supply of a plurality of fluids in controlled quantities into a container set underneath said head on a resting surface of the paint supply device inside said opening or access; said system comprising:
    means for releasing or clamping said fluid-dispensing head configured for enabling movement of said supply head between a first clamped position of use, wherein said nozzles supply the plurality of fluids into a container, and a second extracted position, distinct from said first position of use, wherein said nozzles are accessible for being cleaned;
    wherein said means for releasing or clamping comprise:
    an L-shaped bracket fixed to said paint supply device, having a first surface set substantially vertically and a second surface set horizontally parallel to the ground;
    a plate housed on said second surface of said L-shaped bracket and having a recess or slot opened on a side facing said opening or access of the paint supply device in which the fluid dispensing head is removably mounted to direct the nozzles downward toward the container and to enable manual extraction of the fluid dispensing head; and
    clamping means for clamping said fluid dispensing head in said recess or slot of said plate.

2. System according to claim 1, wherein said means for releasing or clamping are configured for enabling movement of said supply head in a third position of use in which the nozzles are oriented upwardly.

3. System according to claim 2, further comprising means for blocking delivery of said plurality of fluids by said nozzles when said fluid-dispensing head is in said second position or in a third position.

4. System according to claim 1, said clamping means comprising an element for pressing the fluid-dispensing head into the recess or slot, and a pin on which said element is pivoted at one end thereof.

* * * * *